(12) United States Patent
Stenmark

(10) Patent No.: US 7,054,436 B2
(45) Date of Patent: May 30, 2006

(54) COMMUNICATION TERMINALS WITH A DUAL USE SPEAKER FOR SENSING BACKGROUND NOISE AND GENERATING SOUND, AND RELATED METHODS AND COMPUTER PROGRAM PRODUCTS

(75) Inventor: Fredrik Stenmark, Malmo (SE)

(73) Assignee: Sony Ericsson Mobile Communication, AB (SE)

( * ) Notice: Subject to any disclaimer, the term of this patent is extended or adjusted under 35 U.S.C. 154(b) by 0 days.

(21) Appl. No.: 10/909,906

(22) Filed: Aug. 2, 2004

(65) Prior Publication Data

US 2006/0023870 A1    Feb. 2, 2006

(51) Int. Cl.
*H04M 1/00*    (2006.01)
(52) U.S. Cl. .......................... 379/388.01; 379/388.04; 379/392.01
(58) Field of Classification Search ........... 379/388.01, 379/388.04, 392.01
See application file for complete search history.

(56) References Cited

U.S. PATENT DOCUMENTS

| 5,485,515 | A | * | 1/1996 | Allen et al. ................. 379/392 |
| 5,748,725 | A | * | 5/1998 | Kubo ..................... 379/392.01 |
| 6,363,344 | B1 | * | 3/2002 | Higuchi ................. 379/388.04 |
| 2003/0118201 | A1 | * | 6/2003 | Leske et al. ................. 381/117 |

* cited by examiner

*Primary Examiner*—Jefferey Harold
(74) *Attorney, Agent, or Firm*—Myers Bigel Sibley & Sajovec, PA

(57) ABSTRACT

Communication terminals, methods, and computer program products are provided that sense background noise via a speaker that is also used to generate sounds. In some methods of operating a communication terminal, and a speaker signal is supplied to a first speaker to generate sound therefrom, a noise sensing signal is received from the first speaker. The noise sensing signal includes a contribution associated with background noise that is incident to the first speaker. Presence of the background noise in the noise sensing signal is determined.

22 Claims, 3 Drawing Sheets

COMMUNICATION TERMINALS WITH A DUAL USE SPEAKER FOR SENSING BACKGROUND NOISE AND GENERATING SOUND, AND RELATED METHODS AND COMPUTER PROGRAM PRODUCTS

FIELD OF THE INVENTION

The present invention generally relates to the field of communications, and more particularly to detecting background noise at a communication terminal.

BACKGROUND OF THE INVENTION

Some communication terminals include a microphone, an ear speaker, and a loudspeaker. The ear speaker is configured to be placed adjacent to an ear for listening. The loudspeaker is configured to generate ring tones and/or for use as a hands-free broadcast speaker.

Background noise at the communication terminal can have numerous undesirable affects on communications through the communication terminal. For example, the background noise may obscure or mask the voice of a user that is sensed by the microphone and communicated from the communication terminal. Background noise can include wind noise and other noise sources, such as vehicles, voices from persons other than the user and/or background music. The background noise can also include feedback from the loudspeaker and/or the ear speaker through the microphone, which may also create an echo effect where, for example, a voice signal received from a user is fed back and heard by that user as an echo of their own voice. Some loudspeakers are located on an opposite side of the communication terminal from the microphone to reduce the amount of sound therefrom that is sensed by the microphone.

Some communication terminals include echo cancellation circuits that use multiple microphones to sense and reduce noise in a microphone signal, such as feedback from a loudspeaker through a microphone.

SUMMARY OF THE INVENTION

Some embodiments of the present invention provide methods of operating a communication terminal. A speaker signal is supplied to a first speaker to generate sound therefrom. A noise sensing signal is received from the first speaker. The noise sensing signal includes a contribution associated with background noise that is incident to the first speaker. Presence of the background noise in the noise sensing signal is determined.

In some further embodiments of the present invention, an incoming telephone call to the communication terminal is sensed, a call indication is generated based thereon, and a ring signal is supplied as the speaker signal to the first speaker to generate a ring sound therefrom based on the call indication. A speaker signal may be supplied to a loudspeaker to generate a handsfree sound therefrom, and the determination of the presence of the background noise may be made during a portion of time when the speaker signal is not supplied to the loudspeaker.

In some other further embodiments of the present invention, a microphone signal is received from a microphone. The microphone signal includes a contribution associated with the background noise. The microphone signal is modified based on the noise sensing signal to reduce at least a portion of the contribution of the microphone signal that is associated with the background noise. A loudness level of the background noise in the noise sensing signal may be determined, and the microphone signal may be amplified with a variable amplification that is based on the loudness level of the background noise. At least a portion of a frequency spectrum of the background noise in the noise sensing signal may be determined, and at least one portion of a frequency spectrum of the microphone signal may be selectively amplified based on the determined frequency spectrum of the background noise in the noise sensing signal. The microphone signal may be selectively amplified by increasing a level of one portion of the microphone signal and decreasing a level of another portion of the microphone signal based on the determined frequency spectrum of the background noise in the noise sensing signal.

In some other further embodiments of the present invention, a communication signal is received that includes a voice signal. The voice signal is modified based on the noise sensing signal to generate a modified voice signal, and the modified voice signal is supplied to a second speaker to generate sound therefrom. The voice signal may be amplified with a variable amplification that is based on the noise sensing signal. The voice signal may be amplified by generating a comfort noise signal having a level that is based on the noise sensing signal, and combining the comfort noise signal and the voice signal to generate the modified voice signal.

In some other further embodiments of the present invention, a speakerphone activation indication is received from a user. Selectively, based on the speakerphone activation indication, either the speaker signal is supplied to the first speaker or a presence of the background noise in the noise sensing signal is determined. Alternatively, based on the speakerphone activation indication, the speaker signal is selectively supplied to the first speaker or to a second speaker, and the determination of presence of the background noise in the noise sensing signal is carried during at least a portion of time while the speaker signal is supplied to the second speaker.

Some other embodiments of the present invention provide communication terminals that include a first speaker and a controller. The first speaker is configured to generate a noise sensing signal based on background noise that is incident to the first speaker, and configured to generate sound based on a speaker signal. The controller is configured to determine presence of the background noise in the noise sensing signal, and configured to supply a speaker signal to the first speaker to generate sound therefrom.

In some further embodiments of the present invention, the controller may be configured to sense an incoming telephone call to the communication terminal and generate a call indication, and configured to supply a ring signal as the speaker signal to the first speaker to generate a ring sound from the first speaker based on the call indication. The first speaker may be a loudspeaker, and the controller may be configured to determine presence of the background noise in the noise sensing signal during a portion of time when the speaker signal is not supplied to the loudspeaker.

In some other further embodiments of the present invention, the communication terminal may include a microphone that is configured to generate a microphone signal, where the microphone signal can include a contribution associated with the background noise, and the controller may be configured to modify the microphone signal based on the noise sensing signal to reduce at least a portion of the contribution of the microphone signal that is associated with the background noise. The controller may be configured to determine a loudness level of the background noise in the noise sensing signal, and configured to amplify the microphone signal with a variable amplification that is based on the loudness level of the background noise. The controller may be configured to determine at least a portion of a frequency spectrum of the background noise in the noise sensing signal, and configured to selectively amplify at least one portion of a frequency spectrum of the microphone signal based on the determined frequency spectrum of the background noise in the noise sensing signal.

In some other further embodiments of the present invention, the communication terminal may include a receiver and a second speaker. The receiver may be configured to receive a communication signal that includes a voice signal, and the controller may be configured to modify the voice signal based on the noise sensing signal to generate a modified voice signal, and configured to supply the modified voice signal to the second speaker to generate sound therefrom. The controller may be configured to amplify the voice signal with a variable amplification that is based on the noise sensing signal. The controller may be configured to generate a comfort noise signal having a level that is based on the noise sensing signal, and configured to combine the comfort noise signal and the voice signal to generate the modified voice signal. The controller may be configured to generate a comfort noise signal having a level that is based on the noise sensing signal, and configured to combine the comfort noise signal and the voice signal to generate the modified voice signal.

In some other further embodiments of the present invention, the controller may be configured to receive a speakerphone activation indication from a user, and configured to selectively carry out one of supplying the speaker signal to the first speaker and determining presence of the background noise in the noise sensing signal based on the speakerphone activation indication. The controller may alternatively be configured to selectively supply the speaker signal to the first speaker or to a second speaker based on the speakerphone activation indication, and configured to carry out the determination of presence of the background noise in the noise sensing signal during at least a portion of time while the speaker signal is supplied to the second speaker.

Some other embodiments of the present invention provide a computer program product configured to operate a communication terminal. The computer program product includes a computer readable storage medium having computer readable program code embodied therein, which includes computer readable program code that is configured to supply a speaker signal to a speaker to generate sound therefrom, and computer readable program code that is configured to determine a presence of background noise in a noise sensing signal from the speaker that is generated based on background noise that is incident to the speaker.

In some further embodiments of the present invention, the computer readable program code further includes computer readable program code that is configured to receive a microphone signal from a microphone, the microphone signal including a contribution associated with the background noise, and computer readable program code that is configured to modify the microphone signal based on the noise sensing signal to reduce at least a portion of the contribution of the microphone signal that is associated with the background noise.

In some other further embodiments of the present invention, the computer readable program code further includes computer readable program code that is configured to modify the voice signal based on the noise sensing signal to generate a modified voice signal, and computer readable program code that is configured to supply the modified voice signal to a second speaker to generate sound therefrom.

In some other further embodiments of the present invention, the computer readable program code further includes computer readable program code that is configured to receive a speakerphone activation indication from a user, and computer readable program code that is configured to selectively carry out, based on the speakerphone activation indication, supplying the speaker signal to the speaker or determining presence of the background noise in the noise sensing signal from the speaker.

In some other further embodiments of the present invention, the computer readable program code further includes computer readable program code that is configured to carry out the determination of presence of the background noise in the noise sensing signal during at least a portion of time when the speaker signal is not supplied to the speaker.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps, components and/or functions without precluding one or more unstated elements, steps, components and/or functions. As used herein the term "and/or" includes any and all combinations of one or more of the associated listed items.

Embodiments according to the present invention are described with reference to block diagrams and/or operational illustrations of communication terminals, methods, and computer program products. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, and which may reside within common or separate packaging. Accordingly, the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" includes, but is not limited to, a terminal that is configured to receive and/or transmit communication signals via a wireline connection, such as via a public-switched telephone network (PSTN) or another data connection/network, and/or via a wireless air interface with, for example, a cellular network, a wireless local area network (WLAN), and/or another communication terminal (e.g., via a Bluetooth interface). Examples of communication terminals include, but are not limited to, cellular phones, satellite phones, headsets (e.g., Bluetooth headset), laptop and/or palmtop computers configured to receive and/or transmit communication signals, and/or other terminals that include a speaker and related controller which can generate sound and can be used to sense background noise.

Figure 1:
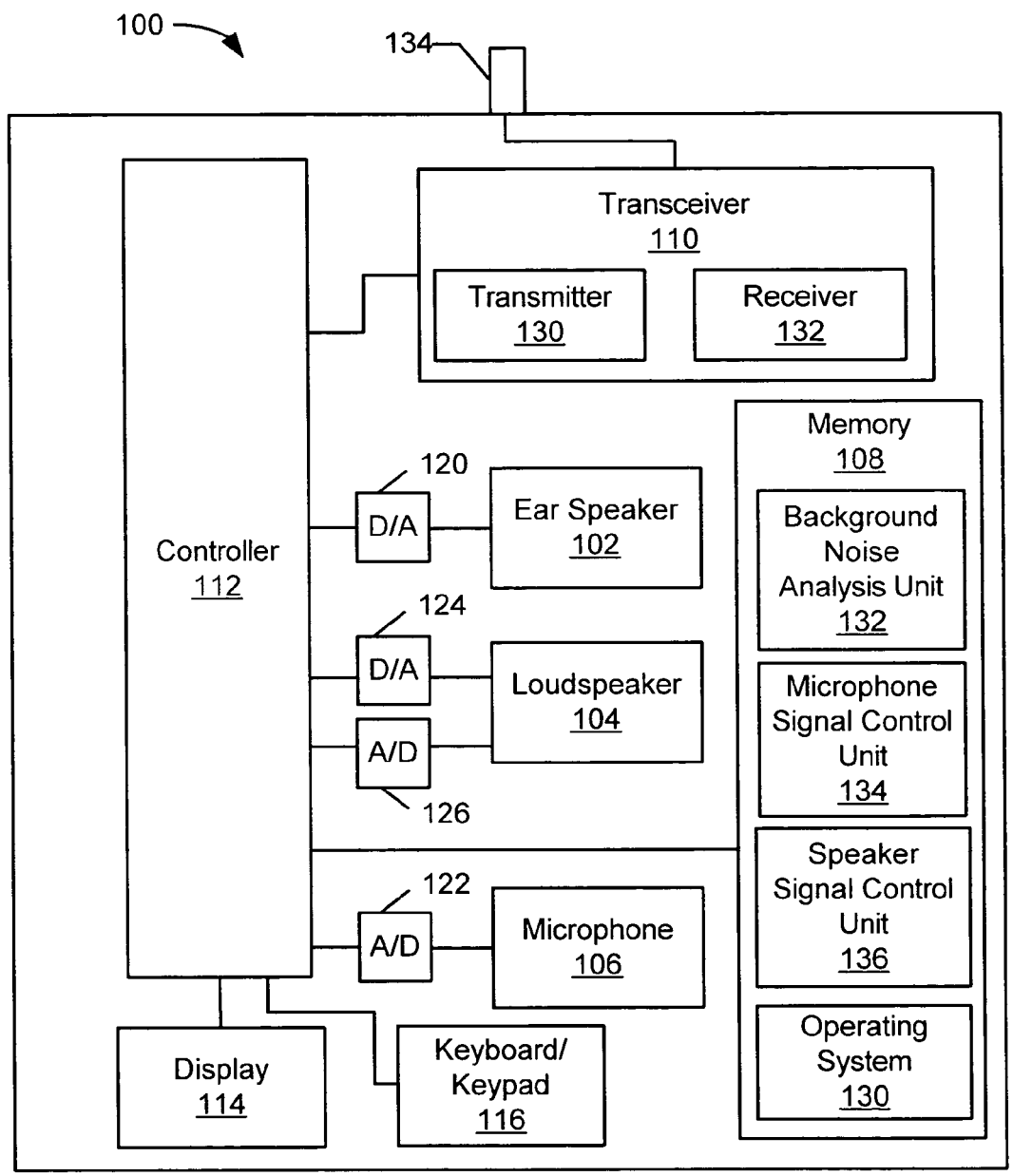
FIG. 1 is a block diagram that illustrates a communication terminal in accordance with various embodiments of the present invention.

Referring now to FIG. 1, an exemplary communication terminal 100, in accordance with some embodiments of the present invention, may include an ear speaker 102, a loudspeaker 104, a microphone 106, a memory 108, and a transceiver 110 that communicate with a controller 112. The communication terminal 100 may also include a display 114 and a keyboard/keypad 116.

The transceiver 110 typically includes both a transmitter 130 and a receiver 132 to allow two way communications, but the present invention is not limited to such devices and, as used herein, a "transceiver" may include only one of the transmitter 130 and the receiver 132. The communication terminal 100 may thereby communicate with a base station and/or another terminal using radio frequency signals, which may be communicated through an antenna 134. For example, the communication terminal 100 may be configured to communicate via the transceiver 110 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS).

The ear speaker 102, loudspeaker 104, and/or the microphone 106 may be within a common housing, or they may be separate but communicatively coupled to the controller 112. For example, the ear speaker 102 and/or the loudspeaker 104 may be a detachable or wireless speaker. The ear speaker 102 may be directed toward a same side of the communication terminal 100 as the microphone 106 and configured. to be placed closely adjacent to a user's ear. In contrast, the loudspeaker 104 may be directed toward an opposite side of the communication terminal 100 relative to the microphone 106, and may be configured to generate higher volume sound than the ear speaker 102. Accordingly, the loudspeaker 104 may be configured for use in generating a ring sound to indicate an incoming call to the communication terminal 100, and/or for use in generating a handsfree received sound so that the communication terminal 100 can be used as a speakerphone in a "handsfree" mode.

The controller 112 is configured to supply a speaker signal to the ear speaker 102, via a digital-to-analog (D/A) converter 120, and/or to the loudspeaker 104, via the D/A converter 124, to cause sound to be generated respectively therefrom. The controller 112 can selectively supply the speaker signal to one or both of the ear speaker 102 and the loudspeaker 104 based on a speakerphone activation indication from a user, which may be input through the keyboard/keypad 116. The controller 112 can sense an incoming telephone call to the communication terminal 100 and generate a call indication based thereon, and can supply a ring signal as the speaker signal to the loudspeaker 104 to generate a ring sound therefrom based on the call indication.

The loudspeaker 104 is also configured to generate a noise sensing signal based on background noise that is incident thereto. For example, the loudspeaker 104 may be a conventional speaker that includes a diaphragm, voice coil, and magnet. Background noise can cause the diaphragm and connected voice coil to move relative to the magnet, and which induces a current signal in the voice coil. The induced current can thereby serve as a noise sensing signal which is passed through an analog-to-digital (A/D) converter 126 to the controller 112.

According to some embodiments of the present invention, the controller 112 is configured to use the loudspeaker 104 to generate sound, such as a ring sound and/or a handsfree received sound, and configured to determine the presence of background noise in the noise sensing signal. For example, the controller 112 may selectively supply the speaker signal to the loudspeaker 104 or determine the presence of background noise in the noise sensing signal based on the speakerphone activation indication. In another example, the controller 112 may carry out the determination of the presence of background noise in the noise sensing signal during at least a portion of time while the speaker signal is not being supplied to the loudspeaker 104, such as during a portion of time while the speaker signal is supplied to the ear speaker 102. Accordingly, the controller 112 can be configured to use the loudspeaker 104 to sense background noise during at least a portion of time when it is not supplying the speaker signal to the loudspeaker 104 (e.g., when the loudspeaker 104 is not being used for ringing or hands free broadcast).

The controller 112 is also configured to modify the speaker signal it supplies to the ear speaker 102 and/or to the loudspeaker 104, and/or to modify a microphone signal that is received from the microphone 106, via the A/D converter 122, based on the noise sensing signal. Such operations, acts, and functionality of the controller 112 are described with regard to software that resides in the memory 108 according to some embodiments of the present invention.

The memory 108 is representative of the overall hierarchy of memory devices containing the software and data used to implement the functionality of the communication terminal 100. As shown in FIG. 1, the memory may include an operating system 130, a background noise analysis unit 132, a microphone signal control unit 134, and a speaker signal control unit 136. As will be appreciated by those of skill in the art, the operating system 130 may be any operating system suitable for operating a communication terminal, and may include, but not be limited to, Symbian, PalmOS, EPOC, Java, Windows CE, Windows95, Windows98, Windows2000 or Windows XP, Mac OS(X), Microsoft Longhorn, Unix and/or Linux.

The controller 112, through the background noise analysis unit 132, can be configured to determine the presence of background noise in the noise sensing signal. The background noise may be, for example, any sound that is not intended by a user to be a contribution to the microphone signal from the microphone 106, and/or it may be sound that originates from a source other than the ear speaker 102 and/or the loudspeaker 104 when a user is attempting to listen. The controller 112 may determine a loudness level of the background noise in the noise sensing signal, such as by comparing a magnitude of the noise sensing signal to one or more threshold values. The controller 112 may determine at least a portion of a frequency spectrum of the background noise in the noise sensing signal by, for example, performing a Fast Fourier Transform on the noise sensing signal. For example, the controller 112 may determine whether the background noise is predominately a low, medium, and/or high frequency sound.

The controller 112, through the microphone signal control unit 134, can be configured to modify the microphone signal from the microphone 106 based on the noise sensing signal to reduce at least a portion of the contribution of the microphone signal that is associated with the background noise. The controller 112 may amplify the microphone signal with a variable amplification that is based on the loudness level of the background noise.

The controller 112 may selectively amplify one or more portions of the frequency spectrum of the microphone signal based on the determined frequency spectrum of the background noise in the noise sensing signal. For example, the controller 112 may increase a level of one portion of the spectrum of the microphone signal where the background noise is determined to be relatively low, and may decrease another portion of the spectrum of the microphone signal where the background noise is determined to be relatively high (e.g., boost low noise level frequency portion(s) and suppress high noise level frequency component(s) of the microphone signal). The controller 112 may modify the microphone signal by inverting the determined frequency spectrum of the background noise and combining the inverted frequency spectrum with the microphone signal so as to suppress the background noise in the microphone signal. The controller 112 may transmit the modified microphone signal from the communication terminal 100 via the transmitter 130.

The controller 112 can receive a communication signal that includes a voice signal (e.g., speech and/or music which may be encoded), via the receiver 132. The controller 112, through the speaker signal control unit 136, can be configured to modify the voice signal based on the noise sensing signal to generate a modified voice signal. The controller 112 may then supply the modified voice signal to the ear speaker 102 and/or the loudspeaker 104 to generate sound therefrom.

The controller 112 may generate the modified voice signal by amplifying the voice signal with a variable amplification that is based on the noise sensing signal. For example, the controller 112 may modify the voice signal to increase the sound volume generated therefrom when the background noise has at least a threshold loudness level. Accordingly, the sound from the speakers 102 and/or 104 may be increased/decreased based on the loudness of the background noise as indicated by the noise sensing signal.

The controller 112 may also generate a comfort noise signal that has a level that is based on the noise sensing signal, and combine the comfort noise signal with the voice signal to generate the modified voice signal. The comfort noise signal may be a relatively low level background noise that is added to the voice signal so that a user can perceive that a call is on-going, and has not been terminated, even though another person involved in the call may not be talking. Accordingly, the comfort noise signal may be increased/decreased based on the loudness of the background noise as indicated by the noise sensing signal.

Although various embodiments of the present invention have been discussed above in the context of the loudspeaker 104 generating the noise sensing signal, it is to be understood that, according to some other embodiments of the present invention, the ear speaker 102 may be used to generate the noise sensing signal. Accordingly, the loudspeaker 104 and the ear speaker 102 may be swapped for each other in FIG. 1. According to yet some other embodiments of the present invention, the ear speaker 102 and the loudspeaker 104 may be substantially the same type of speaker, and in some other embodiments the communication terminal 100 may include only one of the speakers 102 and 104, which is configured to generate sound based on a speaker signal and to generate the noise sensing signal.

Figure 2:
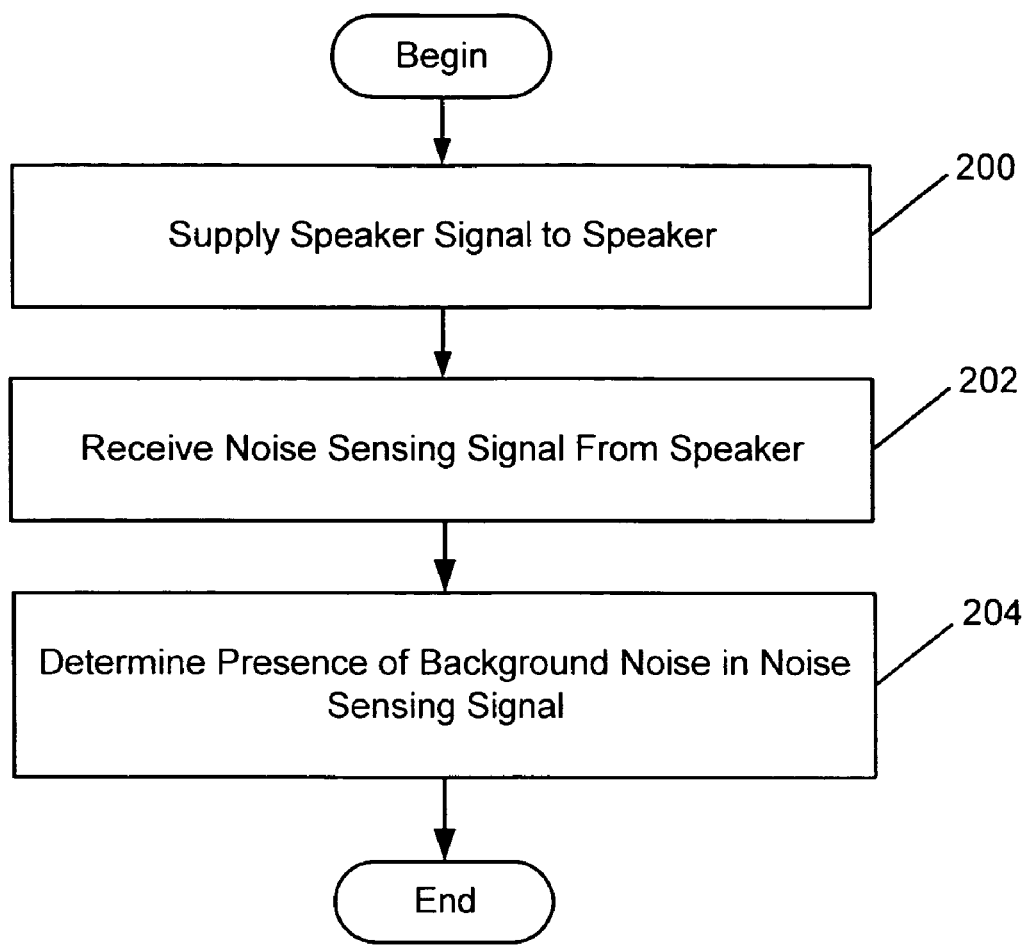
FIG. 2 is a flowchart that illustrates operations for operating a communication terminal in accordance with some embodiments of the present invention.

FIG. 2 is a flowchart of operations that may be used to operate a communication terminal according to some embodiments of the present invention. At Block 200, a speaker signal is supplied to a speaker. At Block 202, a noise sensing signal is received from the speaker. At Block 204, a presence of background noise in the noise sensing signal is determined. The presence of background noise in the noise sensing signal can be determined during at least a portion of time while the speaker signal is not supplied to the speaker. In some other embodiments of the present invention, the operations of Block 202 are carried out before the operations of Block 200.

Figure 3:
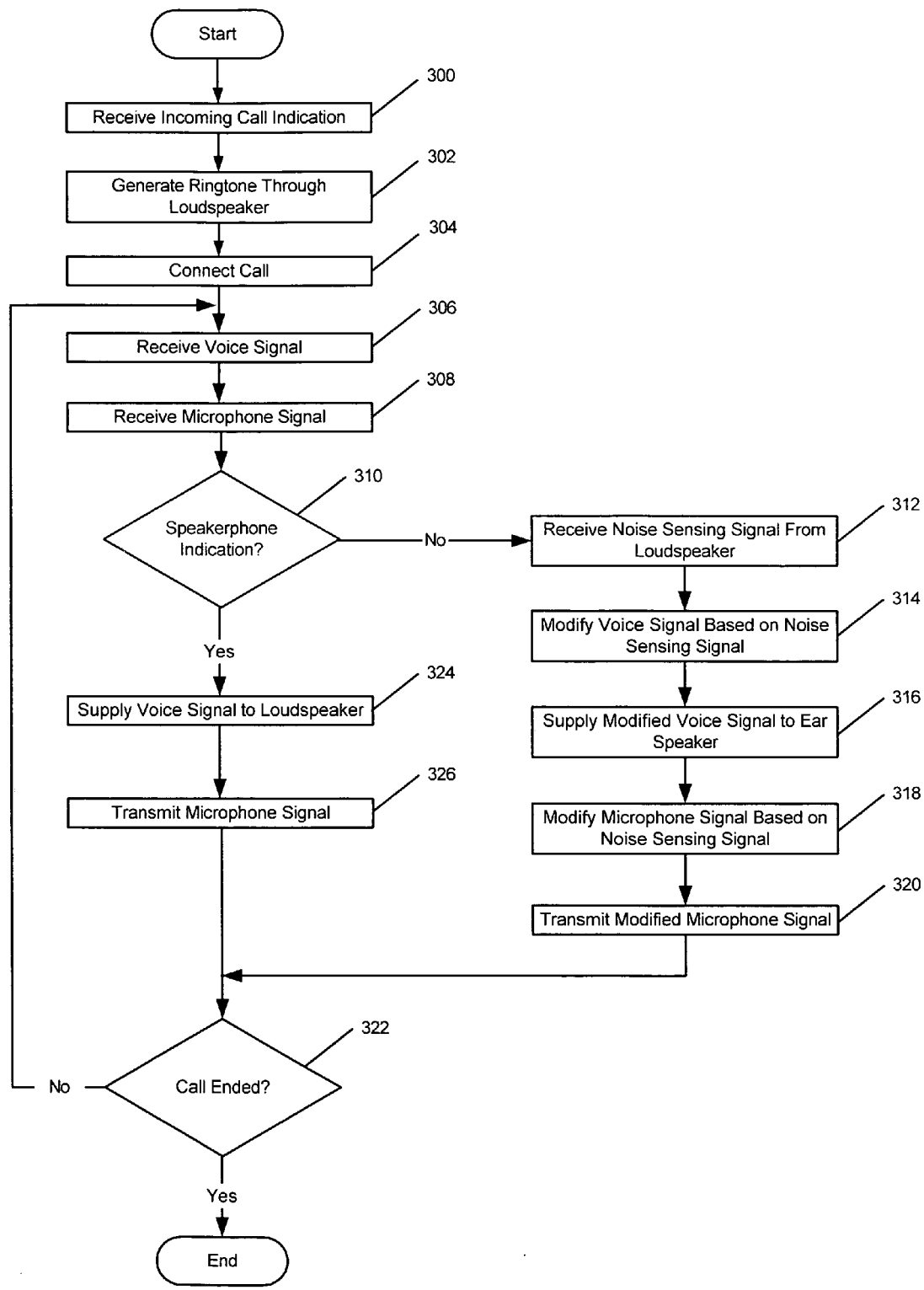
FIG. 3 is a flowchart that illustrates operations for operating a communication terminal in accordance with further embodiments of the present invention.

FIG. 3 is a flowchart of further operations that may be used to operate a communication terminal according some further embodiments of the present invention. At Block 300, an indication of an incoming call is received. The indication may, for example, be a page message directed to the communication terminal that is received over a wireless interface (e.g., cellular control channel), or it may be a ring indication received over a wireline connection. At Block 302, a ringtone is supplied to a loudspeaker to generate a ring sound therefrom. At Block 304, the call is connected. At Block 306, a voice signal is received over, for example, a wireless interface (e.g., cellular traffic channel) or a wireline connection. At Block 308, a microphone signal is received from a microphone. At Block 310, a decision is made as to whether a speakerphone indication has been received from a user (e.g., a user selection of a speakerphone mode for the communication terminal).

If the speakerphone indication has not been received, then at Block 312 a noise sensing signal is received from the loudspeaker. At Block 314, the voice signal is modified based on the noise sensing signal, and, at Block 316, the modified voice signal is supplied to an ear speaker. At Block 318, the microphone signal is modified based on the noise sensing signal, and, at Block 320, the modified microphone signal is transmitted from the communication terminal (e.g., over a wireless or wireline interface). At Block 322, a decision is made as to whether the call has ended, and, if it has not ended, the operation loops back to continue from Block 306.

When the decision at Block 310 is that a speakerphone indication has been received, then at Block 324 the voice signal is supplied to the loudspeaker. At Block 326, the microphone signal is transmitted from the communication terminal.

In some other embodiments of the present invention, the operations of Block 312 are carried out between the operations of Blocks 300 and 302. For example, the loudness of the ring tone generated at Block 302 may be based on the measured loudness of noise in a room (e.g., moderate-volume in a quiet surrounding and loud in a noisy surrounding).

Many variations and modifications can be made to the preferred embodiments without substantially departing from That which is claimed is:

1. A method of operating a communication terminal, the method comprising:
   supplying a speaker signal to a first speaker to generate sound therefrom;
   receiving a noise sensing signal from the first speaker, the noise sensing signal including a contribution associated with background noise that is incident to the first speaker;
   determining a presence of the background noise in the noise sensing signal;
   receiving a speakerphone activation indication from a user;
   selectively supplying the speaker signal to the first speaker or to a second speaker in response to the speakerphone activation indication; and
   carrying out the determining a presence of the background noise in the noise sensing signal during at least a portion of time while the speaker signal is supplied to the second speaker.

2. The method of claim 1, further comprising:
   sensing an incoming telephone call to the communication terminal and generating a call indication based thereon; and
   supplying a ring signal as the speaker signal to the first speaker to generate a ring sound therefrom based on the call indication.

3. The method of claim 1, wherein:
   the first speaker comprises a loudspeaker that is configured to generate a handsfree sound therefrom; and
   the second speaker comprises an earphone speaker.

4. The method of claim 1, further comprising:
   receiving a microphone signal from a microphone, the microphone signal including a contribution associated with the background noise; and
   modifying the microphone signal based on the noise sensing signal to reduce at least a portion of the contribution of the microphone signal that is associated with the background noise.

5. The method of claim 4, wherein modifying the microphone signal comprises:
   determining a loudness level of the background noise in the noise sensing signal; and
   amplifying the microphone signal with a variable amplification that is based on the loudness level of the background noise.

6. The method of claim 4, wherein modifying the microphone signal comprises:
   determining at least a portion of a frequency spectrum of the background noise in the noise sensing signal; and
   selectively amplifying at least one portion of a frequency spectrum of the microphone signal based on the determined frequency spectrum of the background noise in the noise sensing signal.

7. The method of claim 6, wherein selectively amplifying at least one portion of a frequency spectrum of the microphone signal comprises increasing a level of one portion of the microphone signal and decreasing a level of another portion of the microphone signal based on the determined frequency spectrum of the background noise in the noise sensing signal.

8. The method of claim 1, further comprising:
   receiving a communication signal that includes a voice signal;
   modifying the voice signal based on the noise sensing signal to generate a modified voice signal; and
   supplying the modified voice signal to the second speaker to generate sound therefrom.

9. The method of claim 8, wherein modifying the voice signal comprises amplifying the voice signal with a variable amplification that is based on the noise sensing signal.

10. The method of claim 8, wherein modifying the voice signal comprises:
    generating a comfort noise signal having a level that is based on the noise sensing signal; and
    combining the comfort noise signal and the voice signal to generate the modified voice signal.

11. A communication terminal comprising:
    a first speaker that is configured to generate a noise sensing signal based on background noise that is incident to the first speaker, and configured to generate sound based on a speaker signal;
    a second speaker that is configured to generate sound based on the speaker signal;
    a controller that is configured to determine presence of the background noise in the noise sensing signal, configured to receive a speakerphone activation indication from a user, configured to selectively supply the speaker signal to the first speaker or to the second speaker in response to the speakerphone activation indication, and configured to carry out the determination of presence of the background noise in the noise sensing signal during at least a portion of time while the speaker signal is supplied to the second speaker.

12. The communication terminal of claim 11, wherein the controller is configured to sense an incoming telephone call to the communication terminal and generate a call indication, and configured to supply a ring signal as the speaker signal to the first speaker to generate a ring sound from the first speaker based on the call indication.

13. The communication terminal of claim 11, wherein:
    the first speaker comprises a loudspeaker; and
    the second speaker comprises an earphone speaker.

14. The communication terminal of claim 11, further comprising a microphone that is configured to generate a microphone signal, the microphone signal including a contribution associated with the background noise, wherein the controller is configured to modify the microphone signal based on the noise sensing signal to reduce at least a portion of the contribution of the microphone signal that is associated with the background noise.

15. The communication terminal of claim 14, wherein the controller is configured to determine a loudness level of the background noise in the noise sensing signal, and configured to amplify the microphone signal with a variable amplification that is based on the loudness level of the background noise.

16. The communication terminal of claim 14, wherein the controller is configured to determine at least a portion of a frequency spectrum of the background noise in the noise sensing signal, and configured to selectively amplify at least one portion of a frequency spectrum of the microphone signal based on the determined frequency spectrum of the background noise in the noise sensing signal.

17. The communication terminal of claim 14, further comprising:
    a receiver that is configured to receive a communication signal that includes a voice signal, and wherein the controller is configured to modify the voice signal based on the noise sensing signal to generate a modified voice signal, and configured to supply the modified voice signal to the second speaker to generate sound therefrom.

18. The communication terminal of claim 17, wherein the controller is configured to amplify the voice signal with a variable amplification that is based on the noise sensing signal.

19. The communication terminal of claim 17, wherein the controller is configured to generate a comfort noise signal having a level that is based on the noise sensing signal, and configured to combine the comfort noise signal and the voice signal to generate the modified voice signal.

20. A computer program product configured to operate a communication terminal, comprising:
  a computer readable storage medium having computer readable program code embodied therein, the computer readable program code comprising:
  computer readable program code that is configured to selectively supply a speaker signal to a first speaker or to a second speaker in response to a speakerphone activation indication to generate sound therefrom; and
  computer readable program code that is configured to determine a presence of background noise in a noise sensing signal from the first speaker that is generated based on background noise that is incident to the speaker, wherein the determination of the presence of background noise is carried out during at least a portion of time while the speaker signal is supplied to the second speaker.

21. The computer program product of claim 20, further comprising:
  computer readable program code that is configured to receive a microphone signal from a microphone, the microphone signal including a contribution associated with the background noise; and
  computer readable program code that is configured to modify the microphone signal based on the noise sensing signal to reduce at least a portion of the contribution of the microphone signal that is associated with the background noise.

22. The computer program product of claim 20, further comprising:
  computer readable program code that is configured to receive a communication signal that includes a voice signal;
  computer readable program code that is configured to modify the voice signal based on the noise sensing signal to generate a modified voice signal; and
  computer readable program code that is configured to supply the modified voice signal to a second speaker to generate sound therefrom.

* * * * *